United States Patent [19]

Hirano et al.

[11] 4,131,717
[45] Dec. 26, 1978

[54] MAGNETIC RECORDING MEDIUM

[75] Inventors: Takayasu Hirano, Tagajyo; Yoshiaki Hisagen, Sendai; Minoru Takamizawa; Hiroshi Yoshioka, both of Annaka, Japan

[73] Assignee: Sony Corporation, Tokyo, Japan

[21] Appl. No.: 797,336

[22] Filed: May 16, 1977

[30] Foreign Application Priority Data

May 18, 1976 [JP] Japan .................................. 51-57585

[51] Int. Cl. ............................................. H01f 10/02
[52] U.S. Cl. .................................. 428/447; 428/451; 428/900
[58] Field of Search ........................ 428/900, 447, 451

[56] References Cited

U.S. PATENT DOCUMENTS

| | | | |
|---|---|---|---|
| 3,993,846 | 11/1976 | Higuchi et al. | 428/447 |
| 3,996,407 | 12/1976 | Gross et al. | 428/447 |
| 4,005,242 | 1/1977 | Kopke et al. | 428/447 |
| 4,007,313 | 2/1977 | Higuchi et al. | 428/447 |

Primary Examiner—Bernard D. Pianalto
Attorney, Agent, or Firm—Hill, Gross, Simpson, Van Santen, Steadman, Chiara & Simpson

[57] ABSTRACT

A magnetic recording medium including a non-magnetic base and a magnetic layer thereon which contains and/or is coated with an organopolysiloxane having an average unit with the formula: exhibits $$(CH_3)(RO)_n(R'COO)_m SiO_{(3-n-m)/2}$$

wherein R is a monovalent hydrocarbon group having from 1 to 5 carbon atoms, R' is an aliphatic monovalent hydrocarbon group having from 7 to 17 carbon atoms; n is zero or a positive number, m is a positive number with the proviso that n + m is less than 3 and the number of Si atoms in a molecule of such organopolysiloxane ranges from 2 to 8. Magnetic recording medium containing such organopolysiloxane material exhibit a substantially reduced dynamic friction coefficient and a substantially reduced tendency of the magnetic layer to lose magnetic particles, along with an improved splicing-ability.

12 Claims, 3 Drawing Figures

MAGNETIC RECORDING MEDIUM

BACKGROUND OF THE INVENTION

1. Field of the Invention

The present invention relates to a magnetic recording medium having a non-magnetic base and a magnetic layer thereon containing magnetizable particles dispersed in a resinous binder in combination with a lubricant.

2. Prior Art

A magnetic recording medium, whether used for audio recording, video recording or other magnetic recording purposes comes in contact with guide members, magnetic heads and the like during use. For example, in a case of a video tape recorder, where high tape velocities are encountered, the tape must have sufficient wear resistance and a relatively small friction coefficient if it is to run smoothly and steadily for a long time. Moreover, the magnetic powder on a recording medium must be sufficiently bound thereto to resist shedding or loosening of such powder during use and in instances where the recording medium is tape, it must exhibit good splicing-ability.

Magnetic recording media which have an increased friction coefficient vibrate at the guide members and at the magnetic heads during the recording operation and/or during the reproducing operation so that the recorded signals or the reproduced signals are distorted from the original signals. In some cases, a so-called "Q" sound, due to the vibration of the magnetic recording media, is encountered.

Efforts have been made to overcome the above-described defects and to impart lubricity or smoothness to the magnetic recording media, but no completely satisfactory lubricant for magnetic recording media, has yet been developed. For example, it has been suggested to use lubricants, such as silicone fluid, castor oil, molybdenum disulfide, graphite, higher fatty acids and the like whereby the lubricant is mixed into a magnetic layer containing a magnetic powder, such as gamma ferric oxide, $\alpha$-$Fe_2O_3$, and a binder, such as polyvinyl chloride. Magnetic recording media containing such lubricants exhibit some wear resistance, but not to a sufficient degree. When a large quantity of one of the above enumerated lubricants is mixed into the magnetic layer in order to further increase the wear resistance, so-called "bleeding" or "blooming" phenomena occur on the magnetic layer. The bleeding or blooming phenomena result from the lubricating agent oozing or diffusing onto the surface of the magnetic layer and becoming separated therefrom. As a result, the surface of the magnetic recording media gets rough and more magnetic powder separates or is rubbed off from the magnetic recording layer during use. When the friction coefficient is too large, the "Q" sound cannot be avoided.

Recently, S. Higuchi et al disclosed and claimed in U.S. Pat. No. 3,993,846 a polyoxyalkylene substituted organosilicon compound having the formula:

$$RO(CHR''CH_2O)_{n_1}(SiCH_3CH_3O)_m(CH_2CHR''O)_{n_2}R'$$

wherein R and R' comprise an aliphatic hydrocarbon group having from 8 to 18 carbon atoms, R'' is a hydrogen atom or a methyl group, m is an integer ranging from 1 to 15 and $n_1$ and $n_2$ are integers whose sums range from 2 to 16 as a lubricant for a magnetic recording medium. This lubricant exhibits considerable promise in providing an improved magnetic recording medium wherein at least some, if not all, of the aforesaid prior art problems are alleviated. S. Higuchi et al also disclosed and claimed in U.S. Pat. No. 4,007,313 a fluoro-organosilicon compound having the formula:

$$(RCOO)_nSi(CH_3)_{3-n}$$
$$|$$
$$CH_2CH_2CF_3$$

wherein R is an aliphatic hydrocarbon group having from 7 to 17 carbon atoms and n is an integer ranging from 1 to 3 as a lubricant for use with the magnetic recording medium. This lubricant also exhibits considerable promise in providing an improved magnetic recording medium wherein at least some, if not all, of the aforesaid prior art problems are alleviated. S. Higuchi et al also disclosed and claimed in U.S. Pat. No 4,007,314 an organosilicon compound having the formula:

$$(RCOO)_nSi(CH_3)_{4-n}$$

wherein R is an aliphatic hydrocarbon group containing from 7 to 17 carbon atoms and n is an integer ranging from 1 to 3 as a lubricant for use with a magnetic recording medium. This lubricant also exhibits considerable promise in providing an improved magnetic recording medium wherein at least some, if not all, of the aforesaid prior art problems are alleviated. While the aforesaid Higuchi et al lubricants are preferred over prior art lubricants, it is nevertheless desirable to develope yet further improved magnetic recording lubricants.

SUMMARY OF THE INVENTION

In accordance with the principles of the present invention, a magnetic recording medium is provided with a non-magnetic base and a magnetic layer formed thereon which includes magnetizable particles dispersed in a resinous binder and a sufficient amount of lubricant to provide lubricating properties to such magnetic layer.

The lubricant used in the practice of the invention comprises an organopolysiloxane material expressed by the following average unit formula:

$$(CH_3)(RO)_n(R'COO)_mSiO_{(3-n-m)/2}$$

wherein R is a monovalent hydrocarbon group having from 1 to 5 carbon atoms, R' is an aliphatic monovalent hydrocarbon group having from 7 to 17 carbon atoms, n is zero or a positive number, m is a positive number with the proviso that the sum of n and m is less than 3 and the number of Si atoms within a molecule of such organopolysiloxane ranges from 2 to 8.

The lubricant of the invention may be intermixed into a magnetic layer and/or the lubricant may be coated onto a magnetic layer. In preferred embodiments, the amount of lubricant intermixed into a magnetic layer ranges from about 0.5 to 6 parts by weight per 100 parts by weight of magnetizable particles within the magnetic layer and the amount of lubricant coated onto a magnetic layer ranges from about 30 to 1500 milligrams per square meter of magnetic layer.

DESCRIPTION OF THE PREFERRED EMBODIMENTS

Figure 1:
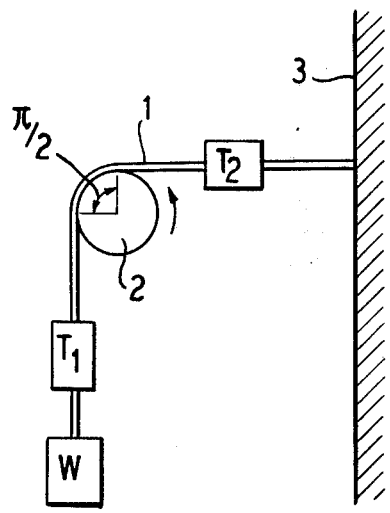
FIG. 1 is a somewhat schematic view illustrating an arrangement for measuring the dynamic friction coefficient, μd, of a magnetic recording tape produced in accordance with the principles of the invention.

The invention provides an improved magnetic recording medium comprised of a non-magnetic base having a magnetic layer thereon comprised of magnetic or magnetizable particles dispersed in a resinous binder in combination with a sufficient amount of an organopolysiloxane lubricant to provide lubricating properties to such magnetic layer.

Magnetic recording media, such as flexible magnetic recording tapes or relatively rigid magnetic recording discs, produced in accordance with the principles of the invention, exhibit superior wear-resistance characteristics relative to prior art magnetic recording media. The friction coefficient of magnetic recording media produced in accordance with the principles of the invention is considerably reduced and the lubricity or smoothness thereof is considerably improved.

Accordingly, magnetic recording media produced in accordance with the principles of the invention run smoothly and steadily over guide members, magnetic heads and the like for a relatively long time. With magnetic recording medium produced in accordance with the principles of the invention, little, if any, "Q" sound is generated. Further, the amount of magnetic powder rubbed off during use of a magnetic recording medium produced in accordance with the principles of the invention is remarkably reduced. In addition, the splicing-ability of magnetic recording tapes produced in accordance with the principles of the invention is remarkably improved.

The organopolysiloxanes used in the practice of the invention are comprised of molecules expressed by the following average unit formula:

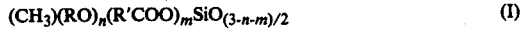

$$(CH_3)(RO)_n(R'COO)_m SiO_{(3-n-m)/2} \quad (I)$$

wherein R is a monovalent hydrocarbon group having from 1 to 5 carbon atoms; R' is an aliphatic monovalent hydrocarbon group having from 7 to 17 carbon atoms; n is zero or a positive number; m is a positive number with the proviso that the sum of n and m is less than 3; and the number of Si atoms in a molecule of such organopolysiloxane material ranges from 2 to 8. As will be appreciated, in silicone chemistry, it is conventional to represent structural formulas of silicon compounds based on a single silicon atom so that the organopolysiloxane materials used in the present invention may be defined by the average unit formula (I) above.

The organopolysiloxanes used in the practice of the invention may be linear, branched or cyclic in molecular configuration. Such organopolysiloxanes have at least one acyloxy group, R'COO—, within a molecule which, optionally, is in combination with one or more alkoxy groups, RO—. The R' within an acyloxy group is a long-chained monovalent saturated or unsaturated hydrocarbon group and in instances where two or more acyloxy groups are present in an organopolysiloxane molecule, the R' portion thereof may be the same or different. The R within an alkoxy group is a monovalent saturated or unsaturated hydrocarbon group and in instances where two or more alkoxy groups are present within a molecule, the R portion thereof may be the same or different.

The number of carbon atoms in an R of an alkoxy group preferably ranges from 1 to 5, because an organopolysiloxane having an alkoxy group therein with more than 5 carbon atoms does not yield practical improvements in splicing-ability and tends to cause an unsatisfactory wear resistance of a magnetic recording medium provided with such a compound.

The number of carbon atoms in an R' of an acyloxy group preferably ranges from 7 to 17, because an organopolysiloxane having an acyloxy group with less than 7 carbon atoms tends to cause an increase in the friction coefficient of magnetic recording medium provided with such compound. On the other hand, an organopolysiloxane having an acyloxy group with more than 17 carbon atoms tends to cause excessive bleeding or blooming and tends to increase the amount of magnetic particles separating or rubbing-off during use of a magnetic recording medium provided with such compound.

Each molecule of the organopolysiloxanes used in the practice of the invention contains from 2 to 8 silicon atoms. In instances where the number of Si atoms within an organopolysiloxane is greater than 8, the friction coefficient of a magnetic recording medium provided with such organopolysiloxane molecule is too large and the lubricity of such recording medium is not improved. On the other hand, when the number of Si atoms within a molecule is 1, the compound no longer comprises an organopolysiloxane but instead comprises an organosilane and the friction coefficient of a magnetic recording medium provided with such organosilane is too large so that satisfactory wear-resistance and lubricity cannot be attained therewith.

In accordance with the principles of the invention, the organopolysiloxane lubricants may be added or intermixed with the magnetic particles and binders used in forming a magnetic layer or the organopolysiloxane lubircant may be coated onto a magnetic layer as a top coat or the magnetic layer may contain the organopolysiloxanes therein and also be coated with a layer of such organopolysiloxane. In embodiments where the lubricant is added within a magnetic layer, the amount of organopolysiloxane ranges from about 0.5 to about 6 parts by weight, per 100 parts by weight of a magnetic powder, such as gamma ferric oxide. In instances where more than 6 parts by weight (based on 100 parts by weight of magnetic particles) of an organopolysiloxane are added to a magnetic powder, the adhesive strength of the resulting magnetic layer is reduced so that the magnetic powder tends to rub off more readily during use, although the friction coefficient of such magnetic layer is reduced. In instances where less than 0.5 parts by weight of an organopolysiloxane are used, insufficient lubricity is provided to the magnetic recording medium and the friction coefficient is insufficiently reduced. In embodiments where the lubricant is top-coated onto a magnetic layer, the lubricant layer is applied so that about 30 to 1500 milligrams of organopolysiloxane is present per square meter of magnetic layer and preferably the amount of organopolysiloxane in a top coat on a magnetic layer ranges from about 60 to 700 milligrams per square meter.

The magnetic powder or magnetizable particles used in magnetic recording media produced in accordance with the invention may be composed of any available magnetic or magnetizable material, such as gamma hematite ($\alpha$-$Fe_2O_3$); magnetite ($Fe_3O_4$); gamma hematite or magnetite doped with non-ferrous atoms, such as cobalt; iron oxides of non-stoichiometric oxidation compounds between gamma hematite and magnetite; chromium dioxide ($CrO_2$); magnetic or magnetizable alloys, such as an iron-cobalt alloy (Fe-Co); and iron-cobalt-nickel alloy (Fe-Co-Ni); mixtures of the above or other magnetic or magnetizable materials.

The resinous binder used in magnetic recording media produced in accordance with the principles of the invention may be any conventionally useful resinous binder, such as vinyl chloride-vinyl acetate copolymer resins; vinyl polyurethane resins; epoxy resins; phenoxy resins; polyester resins; mixtures thereof or other like resinous binders.

Magnetic recording media produced in accordance with the principles of the invention may also include antistatic agents of the type conventionally used with magnetic recording media. An example of a suitable antistatic agent is carbon black but other suitable antistatic agents may also be used. Further, dispersing agents, such as lecithin and the like, may be added to a magnetic layer of a magnetic recording medium in accordance with conventional practices.

The magnetic recording medium of the invention may comprise any of the known forms, such as magnetic recording tapes having a flexible non-magnetic film base, discs having a relatively rigid non-magnetic base such as composed of a ceramic or a metal, for example, aluminum.

The organopolysiloxane compounds used in the practice of the invention may be synthesized in relatively high yields via various routes. For example, an ester interchange reaction may be effected wherein methylalkoxy polysiloxane having an average unit formula:

$$(CH_3)(RO)_{n'}SiO_{(3-n')/2} \quad (II)$$

wherein R is a monovalent hydrocarbon group having from 1 to 5 carbon atoms, n' is a positive number less than 3, and the number of Si atoms in a molecule of the methylalkoxy polysiloxane ranges from 2 to 8 is reached with a fatty acid having the formula R'COOH, wherein R' is an aliphatic monovalent hydrocarbon group having from 7 to 17 carbon atoms. The methylalkoxy polysiloxane (II) described above, may be obtained by a condensation reaction of the partial hydrolysis product of methyltrialkoxysilane, which may be represented by the formula $CH_3Si(OR)_3$ wherein R is identical with R in formula (II) above. The above ester interchange reaction may be expressed by the following equation:

$(CH_3)(RO)_nSiO_{(3-n'/2}+mR'COOH\rightarrow(CH_3)-$
$(RO)_n(R'COO)_mSiO_{(3-n-m)/2}+mROH$ (III)

wherein R and R' are the same as above and n' is equal to the sum of m and n.

Another exemplary synthesis route for attaining the organopolysiloxane compounds of the invention is a dehydrochlorination reaction wherein methylchloropolysiloxane expressed by the following average unit formula:

$$(CH_3)(Cl)_{n'}SiO_{(3-n')/2} \quad (IV)$$

wherein n' is a positive number less than 3 and the number of Si atoms in a molecule of the methylchloropolysiloxane ranges from 2 to 8 is reacted with an alcohol having the formula ROH wherein R is a monovalent hydrocarbon group having from 1 to 5 carbon atoms and with a fatty acid having the formula R'COOH wherein R' is an aliphatic monovalent hydrocarbon group having from 7 to 17 carbon atoms. The methylchloropolysiloxane (IV) described above may be obtained by a condensation reaction of the partial hydrolysis product of methyltrichlorosilane, which has the formula $CH_3SiCl_3$. The above dehydrochlorination reaction may be expressed by the following equation:

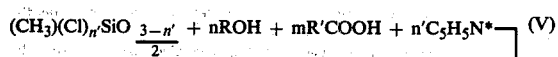
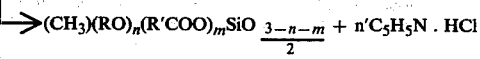

wherein R and R' are the same as above and n' is equal to the sum of n and m (* preferably pyridine or another suitable dehydrochlorination agent).

With the foregoing general discussion in mind, the following specific examples are presented to further illustrate to those skilled in the art the manner in which the invention is carried out. However, the examples are not to be construed as limiting the scope of the invention in any way.

EXAMPLE I

In this exemplary embodiment of the invention, six samples of the above described organopolysiloxanes were prepared in an essentially identical manner so that the synthesis route for the organopolysiloxane in inventive sample No. 1 will only be described in detail.

316 Grams (one mole) of a methylmethoxypolysiloxane, obtained by the partial hydrolysis-condensation of $CH_3Si(OCH_3)_3$ and which has the following formula:

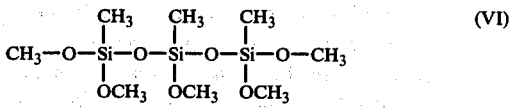

and 316 grams (2 moles) of pelargonic acid, $C_8H_{17}COOH$, were added into 500 grams of toluene. 2.0 Grams of trifluoroacetic acid were added as a catalyst into the above mixture and the mixture was then heated, with stirring. The methanol, which formed during the substitution reaction, was distilled azeotropically from the mixture, along with toluene. When about a theoretical amount of methanol was removed, the mixture was cooled and the catalyst was neutralized with sodium carbonate, $Na_2CO_3$. The mixture was then filtered and the remaining solvent was removed. In this manner, 528 grams of an organopolysiloxane expressed by the following average unit formula: $(CH_3)(CH_3O)(C_8H_{17}COO)_{2/3}SiO_{2/3}$(i.e., a molecule of this compound had 3 silicon atoms therein), was obtained. This organopolysiloxane was a light-yellow liquid having a viscosity of 25 cS at 25° C. and a yield of about 93% theoretical was obtained.

The organopolysiloxanes specified in inventive samples 2, 3, 4, 5 and 6 as shown in Table I below were obtained in a similar manner as that described above.

Two parts by weight (based on 100 parts by weight of magnetic powder) of each of the organopolysiloxanes shown in Table I were added into a magnetic composition having the following ingredients (wherein all amounts shown are by weight):

| Ferromagnetic chromium dioxide powder | 100 parts |
|---|---|
| Saturated Polyester resin[1] | 10.0 parts |
| Phenoxy resin[2] | 10.0 parts |
| Polyurethane resin[3] | 10.0 parts |
| Dispersing agent[4] | 1.0 part |
| Methylethylketone | 150 parts |
| Methylisobutylketone | 150 parts |

[1] a commercially available saturated polyester resin available under the trade name "Vitel PE-200" from Goodyear Tire & Rubber Corp.
[2] a commercially available phenoxy resin available under the trade name "Bakelite Phenoxy Resin PKHH" from Union Carbide Corp.
[3] a commercially available polyurethane resin available under the trade name "Estane 5702" from B. F. Goodrich Corp.
[4] a commercially available dispersing agent comprised of N-tallowoxy-trimethylenediamine available under the trade name "Duomeen T" from Armour & Chemical Corp.

The above magnetic composition containing an organopolysiloxane therein was then mixed with a polyisocyanate compound (for example, a commercially available polyisocyanate, such as comprised of the reaction product of 1 mole of 1,1,1-trimethylolpropane and 3 moles of 2,4-toluenediisocyanate, available under the trade name "Desmodur L-75" which comprises a mixture containing about 75% of the above reaction product and about 25% of a solvent, such as ethyl acetate, from Bayer Corp.) in a ball mill. The mixture was then passed through a metal filter having an average opening size of about 3 μm. The filtered mixture was then uniformly applied onto a flexible non-magnetic film base (for example, composed of polyethylene terephthalate) of 23 μm thickness in such a coating amount that the coated film became about 35 μm thick after drying (i.e., the dried applied coating had a thickness of about 12 μm). The polyethylene terephthalate films coated with the aforesaid filtered compositions or mixtures were dried, calendered and heated at a temperature of 60° C. for 24 hours to cure the resins. The so-produced films were then cut into ¼ inch wide ribbons or tapes. The magnetic recording tapes of inventive samples Nos. 1 to 6 in Table I below were all prepared in the foregoing manner.

The "Q" sound, the dynamic friction coefficient, μd, the rubbed-off amount of magnetic powder and the splicing-ability of the foregoing exemplary tapes were measured by the following methods:

(1) "Q" sound (fluttering of magnetic recording tape) The above described ¼ inch tapes were loaded into a professional tape recorder, model ES manufactured by Sony Corp., and were run therein under different conditions. The obtained results were evaluated and recorded in terms of six grades on the basis of the following standards wherein grade (−5) represents the worst and grade (0) represents the best.

| Grade | Back-tension (Load condition)(g.cm) | Impedance Roller | Fluttering of Tape ("Q" sound) |
|---|---|---|---|
| −5 | 300 | moved | generated |
| −4 | 840 | moved | generated |
| −3 | 840 | stopped | generated |
| −2 | 840 | stopped | generated at times |
| −1 | 840 | stopped | scarcely generated |
| 0 | 840 | stopped | not generated |

(2) Dynamic friction coefficient, μd. As shown in FIG. 1, a tape 1 of ¼ inch width was contacted with the periphery of a brass cylinder 2 over about a quadrant of the peripheral surface of such cylinder. One end of the tape 1 was horizontally fixed to a support means 3 and a weight W of 100 grams was fixed to the other free end of the tape 1 to provide a given tension on the latent portion of the tape. The cylinder 2 was then controllably rotated at such a rate that the peripheral speed thereof was 0.75 mm/sec relative to the tape. Tension gauges $T_1$ and $T_2$ were arranged on the tape 1 between the weight W and the cylinder 2 and between the cylinder 2 and the support means 3 respectively as shown and tensions $t_1$ and $t_2$ were then noted. The dynamic friction coefficient, μd, was then calculated by the following equation:

$$\mu d = 2/\pi \log_e t_2/t_1$$

(3) Rubbing-off amount of magnetic powder. A standard lapping or sanding tape No. 800, produced in accordance with JIS (Japanese Industrial Standards) R 6001 and JIS R 6253 was wound on a roller. An exemplary ¼ inch width tape produced as above was hung over the roller under a compressive force of 100 grams and slid back and forth over such roller for a length of 10 cm. The decrease in weight of the abraded exemplary tape was measured in milligrams. The decrease in weight corresponded to the rubbed-off amount of powder.

(4) Splicing-ability.

Figure 2:
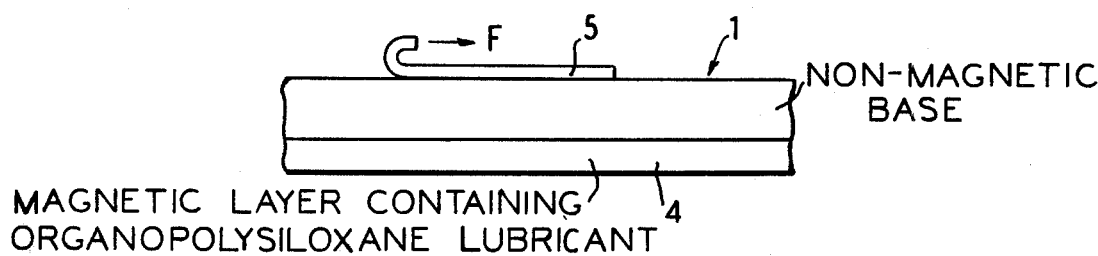
FIG. 2 is a somewhat schematic view illustrating an arrangement for measuring the splicing-ability of a magnetic recording tape produced in accordance with the principles of the invention.
Figure 3:
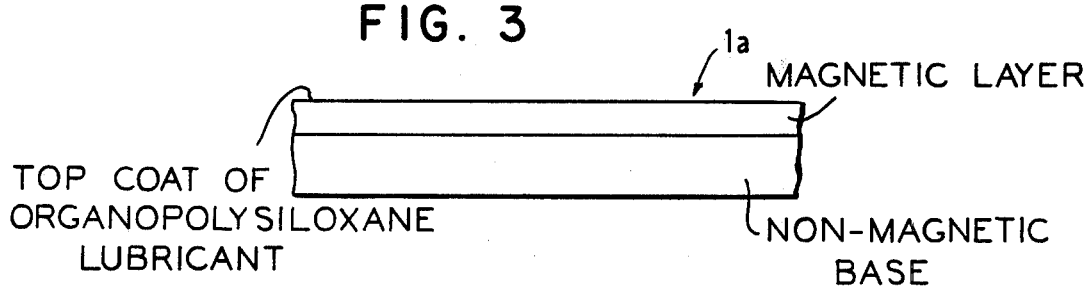
FIG. 3 is a somewhat schematic elevational view illustrating an embodiment of a magnetic recording medium produced in accordance with the principles of the invention.

Exemplary tape produced as above was wound on a roller and maintained at a temperature of 45° C. under relative humidity of 80% for three days. Under such conditions, some of the lubricant within the magnetic layer of the tape was transferred to the back surface of the next layer of tape within the roll. Then, as shown in FIG. 2, an adhesive tape 5 (for example, commercially available under the trade designation "41" from the Minnesota Mining and Manufacturing Corp.) of ¼ inch width was pressed at a pressure of about 2 kilograms onto the back surface of the tape (which is opposite to the magnetic layer 4 of the tape 1). The end of the adhesive tape 5 was then lifted from tape 1 and was pulled in the direction F shown by the arrow on FIG. 2. The pulling force F at which the adhesive tape 5 began peeling from the tape was measured in grams and is tabulated below. The larger the pulling force F, the better the splicing-ability of the particular tape.

The results obtained was inventive samples Nos. 1 to 6 produced as above are set forth in Table I below, along with comparative samples Nos. 1 through 7, which were prepared essentially identically to the inventive sample except that different types of organopolysiloxanes, identified in the Table, were utilized.

TABLE I

| Inventive Sample No. | Organopolysiloxane Number of silicon atoms | | R | n | R' | m | "Q" Sound | Dynamic Friction Coefficient μd | Rubbed-off Amount of Power (μg) | Splicing-ability (g) |
|---|---|---|---|---|---|---|---|---|---|---|
| 1 | 3 | linear trisiloxane | CH₃ | 1 | C₈H₁₇ | 2/3 | 0 | 0.278 | 59 | 89 |
| 2 | 3 | " | C₂H₅ | 1 | C₁₅H₃₁ | 2/3 | −1 | 0.272 | 61 | 80 |
| 3 | 3 | " | C₃H₇ | 1 | C₁₇H₃₃ | 2/3 | 0 | 0.263 | 72 | 83 |
| 4 | 5 | cyclopentasiloxane | CH₃ | 3/5 | C₈H₁₇ | 2/5 | 0 | 0.265 | 61 | 88 |
| 5 | 5 | " | C₂H₅ | 3/5 | C₁₅H₃₁ | 2/5 | 0 | 0.263 | 64 | 84 |
| 6 | 5 | " | C₃H₇ | 3/5 | C₁₇H₃₃ | 2/5 | 0 | 0.271 | 70 | 91 |
| Comparative Sample No. | | | | | | | | | | |
| 1 | 3 | linear trisiloxane | CH₃ | 1 | C₆H₁₃ | 2/3 | −5 | 0.430 | 30 | 80 |
| 2 | 3 | " | C₆H₂₃ | 1 | C₁₁H₂₃ | 2/3 | −1 | 0.288 | 70 | 20 |
| 3 | 3 | " | C₂H₅ | 1 | C₁₈H₃₇ | 2/3 | unmeasurable** | — | — | — |
| 4 | 5 | cyclopentasiloxane | CH₃ | 3/5 | C₆H₁₃ | 2/5 | −5 | 0.431 | 82 | 94 |
| 5 | 5 | " | C₆H₁₃ | 3/5 | C₁₅H₃₁ | 2/5 | −1 | 0.289 | 73 | 14 |
| 6 | 5 | " | CH₃ | 3/5 | C₁₈H₃₇ | 2/5 | unmeasurable** | — | — | — |
| 7 | | Methylphenylsilicone fluid* | | | | | −5 | 0.440 | 350 | 21 |

*Commercially available under the Trade Name "KF 54" from Shin-Etsu Chemical Co., Ltd., Japan
**Blooming or bleeding occurred As is apparent from Table I, inventive sample Nos. 1 to 6 wherein the respective organopolysiloxane lubricant included an R having 1 to 3 carbon atoms and an R' having 8 to 17 carbon atoms, respectively, exhibited superior valves in "Q" sound, dynamic friction coefficient, rubbing-off amount of magnetic powder and splicing-ability. On the other hand, the results for the comparative samples Nos. 1 to 7 shown in Table I, clearly indicates that when either the R portion of an organopolysiloxane has more than 5 carbon atoms or when the R' portion of an organopolysiloxane has less than 7 or more than 17 carbon atoms, substantially inferior valves for the measured properties were attained.

EXAMPLE II

In this exemplary embodiment of the invention, eight inventive samples, Nos. 7 to 14 were prepared substantially as described in Example I. However, in this embodiment, the organopolysiloxane in all samples was a linear trisiloxane which contained 3 silicon atoms, had an R which was CH₃, had an R' which was C₁₅H₃₁, had an m equal to ⅔ and had an n equal to 1. The amount of the foregoing organopolysiloxane was varied, as shown in Table II below, in each of the samples. The respective sample tapes were prepared essentially in the manner described for Example I. These samples were then tested for their dynamic friction coefficient and rubbing-off amount of powder as set forth above and the results were tabulated in Table II. A comparative sample, No. 8, wherein no organopolysiloxane was added into an otherwise identical composition was also tested and the results are shown in Table II.

TABLE II

| Inventive Sample No. | Added Lubricant Amount (parts by weight) | Dynamic Friction Coefficient (μd) | Rubbing-off Amount of Powder (μg) |
|---|---|---|---|
| 7 | 0.5 | 0.281 | 58 |
| 8 | 1.0 | 0.275 | 60 |
| 9 | 2.0 | 0.271 | 62 |
| 10 | 3.0 | 0.270 | 68 |
| 11 | 4.0 | 0.267 | 71 |
| 12 | 5.0 | 0.266 | 79 |
| 13 | 6.0 | 0.263 | 80 |
| 14 | 7.0 | 0.263 | 121 |
| Comparative Sample No. | | | |
| 8 | 0 | 0.448 | |

As is apparent from the foregoing Table II, the inventive sample Nos. 7 to 13 which contained 0.5 to 6.0 parts by weight of the linear trisiloxane showed acceptable and/or superior values both in dynamic friction coefficient and in the rubbing-off amount of powder. Inventive sample No. 14 showed an acceptable dynamic friction coefficient but had an impractical powder loss during the rubbing-off test while comparative sample No. 8 had an unacceptably high dynamic friction coefficient.

EXAMPLE III

In this exemplary embodiment of the invention, seven inventive samples, Nos. 15 through 21, were prepared in an essentially identical manner to that described in Example I. In this embodiment, the organopolysiloxanes utilized were linear polysiloxanes which contained from 2 to 8 silicon atoms per molecule as indicated in Table III below, had an R which was C₃H₇, had an R' which was C₁₇H₃₃ and had n and m values as stated in Table III. The respective sample tapes were prepared in the manner set forth above and were tested for the tabulated results as indicated earlier. Comparative samples, Nos. 9 and 10 were similarly prepared and tested. Comparative sample No. 9 contained an organosilane, (CH₃)(C₃H₇)(C₁₇H₃₃COO)₂Si and comparative sample No. 10 contained an organopolysiloxane which had 9 silicon atoms per molecule thereof, had an R which was C₃H₇, had an R' which was C₁₇H₃₃ and had an n and m values indicated in Table III.

TABLE III

| Inventive Sample No. | Organopolysiloxane Number of Si Atoms in Lubricant | n | m | "Q" Sound | Dynamic Friction Coefficient ($\mu d$) | Rubbing-off Amount Of Powder ($\mu g$) | Splicing-Ability (g) |
|---|---|---|---|---|---|---|---|
| 15 | 2 | 1 | 1 | 0 | 0.263 | 98 | 93 |
| 16 | 3 | 2/3 | 1 | 0 | 0.265 | 83 | 97 |
| 17 | 4 | 3/4 | 3/4 | 0 | 0.262 | 86 | 83 |
| 18 | 5 | 4/5 | 3/5 | 0 | 0.271 | 89 | 84 |
| 19 | 6 | 5/6 | 3/6 | 0 | 0.269 | 93 | 97 |
| 20 | 7 | 5/7 | 4/7 | 0 | 0.275 | 94 | 88 |
| 21 | 8 | 5/8 | 5/8 | −1 | 0.281 | 90 | 85 |
| Comparative Sample No. | | | | | | | |
| 9 | 1 | 1 | 2 | −2 | 0.321 | 201 | 92 |
| 10 | 9 | 8/9 | 6/9 | −3 | 0.302 | 153 | 101 |

As can be seen from the above results, the dynamic friction coefficient, $\mu d$, the "Q" sound and the rubbed-off amount of powder was sufficiently small for all of the inventive samples tested. On the other hand, the friction coefficient, $\mu d$, was too large, some "Q" sound was generated and the rubbed-off amount of powder was too large for comparative sample Nos. 9 and 10 so that such magnetic tapes are not preferred or practical.

EXAMPLE IV

In this embodiment of the invention, eighteen inventive samples, Nos. 22 through 39 were prepared in an essentially identical manner to that described in Example I. The various organopolysiloxanes utilized in invention samples Nos. 22 through 39 are shown in Table IV below. The respective sample tapes were prepared and tested as indicated earlier and the results are tabulated in Table IV.

TABLE IV

| Inventive Sample No. | Organopolysiloxane Number of Si Atoms in Lubricant | R | n | R' | m | "Q" Sound | Dynamic Friction Coefficient ($\mu d$) | Rubbing-off Amount of Powder ($\mu g$) | Splicing-ability (g) |
|---|---|---|---|---|---|---|---|---|---|
| 22 | | | 1/3 | | 4/3 | 0 | 0.265 | 83 | 83 |
| 23 | | | 2/3 | | 3/3 | 0 | 0.263 | 84 | 91 |
| 24 | 3 | $CH_3$ | 3/3 | $C_8H_{17}$ | 2/3 | 0 | 0.271 | 86 | 102 |
| 25 | | | 4/3 | | 1/3 | 0 | 0.281 | 85 | 103 |
| 26 | | $CH_3$ | 1/4 | $C_{11}H_{23}$ | 5/4 | 0 | 0.273 | 84 | 80 |
| 27 | | \ | 2/4 | | 4/4 | 0 | 0.263 | 83 | 102 |
| 28 | 4 | CH— | 3/4 | | 3/4 | 0 | 0.265 | 86 | 93 |
| 29 | | / | 4/4 | | 2/4 | 0 | 0.269 | 84 | 86 |
| 30 | | $CH_3$ | 5/4 | | 1/4 | 0 | 0.273 | 85 | 101 |
| 31 | | | 1/5 | | 6/5 | 0 | 0.265 | 93 | 42 |
| 32 | | | 2/5 | | 5/5 | 0 | 0.273 | 94 | 83 |
| 33 | | | 3/5 | | 4/5 | 0 | 0.263 | 80 | 103 |
| 34 | 5 | $C_4H_9$ | 4/5 | $C_{17}H_{33}$ | 3/5 | 0 | 0.271 | 83 | 93 |
| 35 | | | 5/5 | | 2/5 | 0 | 0.273 | 84 | 101 |
| 36 | | | 6/5 | | 1/5 | −2 | 0.213 | 94 | 111 |
| 37 | 3 | — | 0 | $C_8H_{17}$ | 5/3 | 0 | 0.273 | 92 | 15 |
| 38 | 4 | — | 0 | $C_{11}H_{23}$ | 6/4 | 0 | 0.265 | 93 | 23 |
| 39 | 5 | — | 0 | $C_{17}H_{33}$ | 7/5 | 0 | 0.264 | 91 | 19 |

As is apparent from the tabulated results in Table IV above, the dynamic friction coefficient, $\mu d$, was satisfactorily small, little, if any, "Q" sound was generated and the rubbed-off amount of powder was low for all of the invention samples in this embodiment.

Attention is directed to the fact that in the above invention samples, the magnetic tapes which contained an organopolysiloxane wherein the ratio n/m (i.e., ratio of alkoxy groups to acyloxy groups) ranged from 0.2 to 5 exhibited a superior splicing-ability.

EXAMPLE V

In this embodiment of the invention, no organopolysiloxane was added into the magnetic composition earlier described. Instead, the earlier described magnetic composition was coated onto polyethylene terephthalate films and processed as earlier described and after the magnetic layer was formed, a top coat of the various organopolysiloxanes identified in Table V below was applied onto such magnetic layers.

The base films were coated with the magnetic composition, dried and calendered as described in Example I. Then, liquid top-coat solutions comprised of 3 grams (per liter of solvent) of an organopolysiloxane shown in Table V, and methylethylketone were prepared and were each applied onto the free surface of a magnetic layer of each inventive sample, Nos. 40 through 42 and to comparative sample Nos. 11 and 12. The amount of applied top coating in each case was about 30 milligrams/m², calculated relative to the organopolysiloxane. The coated magnetic layers were then dried to prepare sample tapes which were then tested as set forth earlier. The results are tabulated in Table V below:

TABLE V

| Inventive Sample No. | Number of Si Atoms in Lubricant | R | n | R' | m | "Q" Sound | Dynamic Friction Coefficient ($\mu d$) | Rubbing-off Amount of Powder ($\mu g$) | Splicing-ability (g) |
|---|---|---|---|---|---|---|---|---|---|
| 40 | 5 | $CH_3$ | 2/5 | $C_{16}H_{33}$ | 1 | 0 | 0.268 | 56 | 89 |
| 41 | 3 | $C_2H_5$ | 1 | $C_{16}H_{33}$ | 2/3 | 0 | 0.265 | 60 | 92 |
| 42 | 2 | $CH_3$ | 1 | $C_{14}H_{29}$ | 1 | 0 | 0.280 | 100 | 85 |

TABLE V-continued

| Comparative Sample No. | | | | | |
|---|---|---|---|---|---|
| 11 | Methylphenylsilicone fluid* | −3 | 0.365 | 360 | 30 |
| 12 | Dimethylsilicone fluid** | −2 | 0.421 | 380 | 20 |

*Available under the trade name "KF 54" from Shin-Etsu Chemical Co., Ltd., Japan
**Available under the trade name "KF 96" from Shin-Etsu Chemical Co., Ltd., Japan As is apparent from the tabulated results in Table V, the sample tapes which were coated (top-coated) with the specified organopolysiloxanes exhibited values in the "Q" sound generated, the dynamic friction coefficient, the rubbed-off amount of powder and splicing-ability which were at least as good as the values for such properties exhibited by earlier sample tapes in which the organopolysiloxanes were added into the magnetic layer.

The solvent in preparing a liquid lubricant top coating composition may be other than methylethylketone mentioned above, for example, dichlorodifluoromethane, $CCl_2F_2$, commercially available under the trade name "Freon-12" from E. I. du Pont de Nemours & Co. or isopropylalcohol or some other compatible solvent may be used in formulating the lubricant top coat composition.

Although several specific embodiments of the invention have been described in the preceding Examples, it should be understood that modifications may be made to such embodiments without departing from the invention. For example, two or more organopolysiloxanes as defined hereinabove may be used in combination on or in a magnetic layer of a magnetic recording medium.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim as our invention:

1. In a magnetic recording medium having a non-magnetic base and a magnetic layer formed thereon containing magnetizable particles dispersed in a resinous binder, the improvement comprising wherein:

said magnetic layer has an organopolysiloxane added into such layer, said organopolysiloxane having an average unit formula:

$$(CH_3)(RO)_n(R'COO)_mSiO_{(3-n-m)/2}$$

wherein R is a monovalent hydrocarbon group having from 1 to 5 carbon atoms, R' is an aliphatic monovalent hydrocarbon group having from 7 to 17 carbon atoms; n is zero or a positive number; m is a positive number with the proviso that n + m is less than 3 and the number of Si atoms in a molecule of such organopolysiloxane ranges from 2 to 8; said organopolysiloxane being present within said magnetic layer in an amount ranging from about 0.5 to 6 parts by weight per 100 parts by weight of magnetizable particles in said magnetic layer.

2. In a magnetic recording medium as defined in claim wherein said magnetic layer includes at least two of said organopolysiloxanes in combination, each as defined by the average unit formula set forth in claim 1.

3. In a magnetic recording medium as defined in claim 1 wherein said organopolysiloxane contains an R' which is $C_{17}H_{33}$.

4. In a magnetic recording medium as defined in claim 1 wherein a molecule of said organopolysiloxane contains 3 silicon atoms.

5. In a magnetic recording medium as defined in claim 1 wherein said organopolysiloxane has a ratio of n/m ranging from 0.2 to 5.

6. In a magnetic recording medium as defined in claim 1 wherein said magnetic layer includes a material selected from the group consisting of antistatic agents, dispersing agents and mixtures thereof.

7. In a magnetic recording medium having a non-magnetic base and a magnetic layer formed thereon containing magnetizable particles dispersed in a resinous binder, the improvement comprising wherein:

said magnetic layer has an organopolysiloxane coated onto the free surface of such layer, said organopolysiloxane having an average unit formula:

$$(CH_3)(RO)_n(R'COO)_mSiO_{(3-n-m)/2}$$

wherein R is a monovalent hydrocarbon group having from 1 to 5 carbon atoms, R' is an aliphatic monovalent hydrocarbon group having from 7 to 17 carbon atoms; n is zero or a positive number, m is a positive number with the proviso that n + m is less than 3 and the number of Si atoms in a molecule of such organopolysiloxane ranges from 2 to 8; said organopolysiloxane being coated onto said magnetic layer in an amount ranging from about 30 to 1500 milligrams per square meter of said magnetic layer.

8. In a magnetic recording medium as defined in claim 7 wherein said magnetic layer includes at least two of said organopolysiloxanes in combination, each as defined by the average unit formula set forth in claim 1.

9. In a magnetic recording medium as defined in claim 7 wherein said organopolysiloxane contains an R' which is $C_{17}H_{33}$.

10. In a magnetic recording medium as defined in claim 7 wherein a molecule of said organopolysiloxane contains 3 silicon atoms.

11. In a magnetic recording medium as defined in claim 7 wherein said organopolysiloxane has a ratio of n/m ranging from 0.2 to 5.

12. In a magnetic recording medium as defined in claim 7 wherein said magnetic layer includes a material selected from the group consisting of antistatic agents, dispersing agents and mixtures thereof.

* * * * *